United States Patent [19]

Wang

[11] Patent Number: 5,142,022
[45] Date of Patent: Aug. 25, 1992

[54] THERMOSETTING RESIN COMPOSITIONS COMPRISING AN UNSATURATED SPIRODILACTAM

[75] Inventor: Pen C. Wang, Houston, Tex.

[73] Assignee: Shell Oil Company, Houston, Tex.

[21] Appl. No.: 659,815

[22] Filed: Feb. 25, 1991

[51] Int. Cl.$^5$ .................. C08G 63/08; C08G 12/12; C08G 12/04; C08G 2/00

[52] U.S. Cl. .................. 528/354; 528/262; 528/266; 528/270

[58] Field of Search ............ 528/354, 262, 266, 270

[56] References Cited

U.S. PATENT DOCUMENTS 4,885,351 12/1989 Wang .................. 526/262
4,921,931 5/1990 Wang .................. 528/322
4,927,908 5/1990 Wang .................. 528/323

OTHER PUBLICATIONS

Klaus and Knowles, J. Appl. Polymer Sci. vol. 10(6) pp. 887–889 (1966).

*Primary Examiner*—John Kight, III
*Assistant Examiner*—T. Mosley

[57] ABSTRACT

Novel thermosetting resin compositions are disclosed which comprise a 2,7-dioxo-1,6-dioxaspiro[4.4]nona-3,8-diene compound and at least one other reactive, polymerizable monomer which has at least two functional group substituents which contain active hydrogen atoms or multiple bonds between adjacent atoms. The thermosetting resins, upon application of heat, give crosslinked, cured products having good properties.

20 Claims, No Drawings

THERMOSETTING RESIN COMPOSITIONS COMPRISING AN UNSATURATED SPIRODILACTAM

FIELD OF THE INVENTION

This invention relates to novel thermosetting resin compositions and to the cured products obtained by the heating thereof. More particularly, the invention relates to thermosetting resin compositions comprising an unsaturated 1,6-dioxa [4.4] spirodilactam and at least one other reactive monomer having at least two functional groups with active hydrogen atoms or multiple bonds between adjacent atoms.

BACKGROUND OF THE INVENTION

The curing or crosslinking of monomeric materials to produce thermoset resins is well known in the art. In general, the polymerizable monomers incorporate at least one and customarily more than one reactive group which serves as a site for the crosslinking or curing polymerization to produce the cured products. There are some polymerizable monomers wherein the active sites are such that the monomer will cure upon application of energy, e.g., heat or high intensity U.V. light. In many if not most cases, however, a curing agent is necessary to allow the curing reaction to take place at an acceptable rate. The curing agents are employed in catalytic or in stoichiometric amounts relative to the monomer to be crosslinked. The stoichiometric curing agents, i.e., those agents which are provided in a substantial amount (although not necessarily precisely stoichiometric) relative to the monomer to be cured are the more commonly used and are typically multi-functional polymerizable materials having a plurality of reactive groups capable of participating in a crosslinking polymerization. A mixture of the monomer and curing agent, generally referred to as a thermosetting resin composition, is then cured by application of heat with or without the presence of an accelerator which may be added to obtain an even more acceptable rate. The reactive groups of the curing agent are typically materials having functional groups which contain active hydrogen atoms, or the equivalent, or multiple bonds between adjacent atoms which may both be carbon atoms or may have one or both atoms which are not carbon atoms.

Certain of the thermosetting resin compositions have polymerizable monomers which are cyclic in chemical character. In Knowles, J. Appl. Polymer Sci., Vol. 10(6) pp. 887-8 (1966), there is disclosed the use of a spirodilactone as a curing agent for epoxy resins. The curing of the epoxy compounds is not accompanied by decrease in volume, possibly because of the opening of the spirodilactone ring during the curing process. The cured products from cyclic monomers are often characterized by a relatively high glass transition temperature in addition to strength, solvent resistance and dimensional stability in applications where the cured products are likely to encounter elevated temperatures. It would be of advantage to provide a novel class of thermosetting resins incorporating polycyclic monomers which cure by reaction with polyfunctional curing agents to provide cured, crosslinked thermoset resin products of relatively high glass transition temperatures and of other good properties.

SUMMARY OF THE INVENTION

The present invention provides curable compositions comprising an unsaturated 1,6-dioxa [4.4] spirodilactone and at least one other reactive, polymerizable monomer of different structure. More particularly, the invention relates to thermosetting resin compositions comprising the unsaturated spirodilactone and at least one other reactive monomer having at least two functional groups with active hydrogen atoms or multiple bonds between adjacent atoms. The invention also provides the cured compositions obtained by heating the thermosetting resin compositions.

DESCRIPTION OF THE INVENTION

The novel thermosetting resin compositions comprise a 2,7-dioxo-1,6-dioxaspiro[4.4]nona-3,8-diene compound and at least one additional reactive monomer having at least two functional groups with active hydrogen atoms or multiple bonds between adjacent atoms. Although a variety of such unsaturated spirodilactones are contemplated by the invention, members of a preferred class of unsaturated spirodilactones have up to 40 carbon atoms inclusive and are represented by the formula

wherein R independently is hydrogen, halogen and preferably a middle halogen chloro or bromo, aliphatic group of up to 10 carbon atoms inclusive and aromatic group of up to 10 carbon atoms inclusive. The R group, when organic, is hydrocarbyl containing only atoms of carbon and hydrogen, or is substituted hydrocarbyl containing additional atoms such as chloro or bromo as monovalent carbon atom substituents. Illustrative of aliphatic R groups are hydrocarbon groups including alkyl groups such as methyl, ethyl, i-butyl, sec-hexyl and decyl, but also aralkyl groups such as benzyl, 4-methylbenzyl and 2-phenylethyl. Illustrative substituted hydrocarbyl groups include 4-chlorobutyl and 3-bromobenzyl. Illustrative aromatic R groups include hydrocarbon aryl groups such as phenyl, tolyl, and xylyl and substituted hydrocarbon aryl groups such as 3-chlorophenyl, 4-bromophenyl and 2-chloro-4-methylphenyl.

Typical 2,7-dioxo-1,6-dioxaspiro[4.4]nona-3,8-diene compounds include 2,7-dioxo-1,6-dioxaspiro[4.4]nona-3,7-diene, 3-methyl-2,7-dioxo-1,6-dioxaspiro[4.4]nona-3,8-diene, 3,8-dimethyl-2,7-dioxo-1,6-dioxaspiro[4.4]nona-3,8-diene, 3,4,8,9-tetramethyl-2,7-dioxo-1,6-dioxaspiro[4.4]nona-3,8-diene, 3-chloro-8-phenyl-2,7-dioxo-1,6-dioxaspiro[4.4]nona-3,8-diene, 3,8-diphenyl-2,7-dioxo-1,6-dioxaspiro[4.4]nona-3,8-diene, 3-bromo-8-tolyl-2,7-dioxo-1,6-dioxaspiro[4.4]nona-3,8-diene, 3-methyl-8-ethyl-2,7-dioxo-1,6-dioxaspiro[4.4]nona-3,8-diene, and 3,8-di(4-chlorobenzyl)-2,7-dioxo-1,6-dioxaspiro[4.4]nona-3,8-diene. The preferred unsaturated spirodilactones of formula I are those having a hydrocarbon R substituent in the 3- and 8-positions and a hydrogen substituent in the 4- and 9-positions. Such unsubstituted spirodilactones are represented by the formula

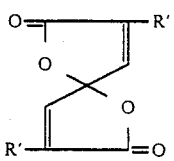

(Ia)

wherein R' independently is alkyl or aryl of up to 10 carbon atoms inclusive. Preferred compounds of formula Ia are those compounds wherein each R' is hydrogen, methyl, phenyl or benzyl.

The 2,7-dioxo-1,6-dioxaspiro[4.4]nona-3,8-diene compounds of the invention (formulas I and Ia) are known compounds or are produced by known methods, for example, by the process described by Schon et al, C. R. Acad. Sci., Paris, Ser. C. 1968, 267(6), 490–493.

The thermosetting resin compositions of the invention comprise the unsaturated spirodilactams of formula I and at least one additional reactive monomer of different structure having up to 30 carbon atoms inclusive and at least two functional groups with active hydrogen atoms or multiple bonds, i.e., more than one single valence bond, between adjacent atoms. The additional polymerizable monomers suitably have a variety of functional substituents active hydrogen atoms or with multiple bonds between adjacent carbon atoms. The multiple bond substituent group is hydrocarbyl with multiple bonds between two adjacent carbon atoms or is non-hydrocarbyl with multiple bonds between two atoms at least one of which is not a carbon atom or with atoms other than carbon and hydrogen present. Illustrative of such substituents are hydrocarbyl substituents such as vinyl, allyl, propargyl and styrylmethyl and non-hydrocarbyl substituents such as cyano, allyloxy, cyanato and maleimido. Illustrative of functional groups with active hydrogen atoms are amino, hydroxy and carboxyl. For the purposes of describing the compositions of the present invention, the anhydride group is considered the functional equivalent of two carboxyl groups and is included within the class of multi-functional active hydrogen compounds although it does not contain active hydrogens.

The precise nature of the structure of the additional polymerizable monomer to which the functional groups are attached is not material so long as it is inert under the conditions at which the thermosetting resins are produced and is not unduly sterically hindered. A variety of organic linking groups which meet these criteria are suitably present in the additional polymerizable monomers. In the preferred embodiments of the invention, the moieties which link the functional groups of active hydrogen atoms or multiple bonds between adjacent carbon atoms are represented by the group L wherein L is isocyanurate or $+R''-X-R''+_r$ wherein R'' is divalent aliphatic or aromatic of up to 10 carbon atoms inclusive, X is a direct valence bond or X is oxy, thio, carbonyl, sulfonyl or carbonato, and r is zero or 1. R'' is quite suitably divalent aliphatic and particularly alkylene, e.g., ethylene, 1,3-propylene or 1,7-octylene, but preferred R'' groups are divalent aromatic or arylene. Particularly preferred as the R'' moiety is phenylene, especially 1,4-phenylene. Expressed differently, the additional polymerizable monomer is represented by the formula $$LZ_z \qquad (II)$$

wherein L has the previously stated significance, Z is a functional group incorporating active hydrogen or multiple bonds between adjacent carbon atoms and z is an integer of at least 2 representing the valence of the linking group L, and preferably z is 2 or 3. Illustrative of additional polymerizable monomers having multiple bond functional groups are 1,9-decadiene, 2,2-di(4-allyloxyphenyl)propane, di(3-cyanatophenyl)methane, 1,5-dicyanatonaphthalene, 4,4'-di(maleimido)biphenyl, 1,3-di(propargyl)benzene, di(4-maleimidophenyl) sulfone, 1-allyl-4-styrylmethylbenzene, 2,2-di(4-cyanatophenyl)propane, triallylisocyanurate, di(4-maleimidophenyl)methane and divinylbenzene. Illustrative of additional polymerizable monomers with active hydrogen substituents are hexamethylene diamine, adipic acid, resorcinol, terephthalic acid, di(4-aminophenyl)methane, phthalic acid anhydride, 2,2-di(4-aminophenyl)propane and di(4-hydroxyphenyl) sulfone.

The thermosetting resin compositions of the invention comprise the unsaturated spirodilactone and at least one polymerizable monomer as described above. The compositions are usefully the unsaturated spirodilactone plus three or even more additional polymerizable monomers but preferably the thermosetting resin compositions comprise the unsaturated spirodilactone plus from one to two, inclusive, additional polymerizable monomers. The precise proportions of the thermosetting resin composition are not critical and each component is suitably present in a quantity of from about 5% by weight based on the total composition to about 95% by weight on the same basis. In the preferred embodiments, the unsaturated spirodilactone is present in a quantity of at least about 40% by weight of the total composition with the additional polymerizable monomer(s) being present in a total of no more than about 60% by weight of the total composition. In even more preferred thermosetting resin compositions the unsaturated spirodilactone is present in a quantity of about 50% by weight based on total composition with one additional monomer being present in at least about 40% by weight on the same basis and with any other additional polymerizable monomer being present as the remainder of the composition.

The thermosetting resin compositions are produced by forming an intimate mixture of the unsaturated spirodilactone and the additional polymerizable monomer(s). The method of mixing is not critical and conventional methods such as stirring, blending or co-melting are satisfactory provided that the mixing does not result in sufficient heat or other energy to cause the curing or crosslinking of the composition.

The curing or crosslinking of the thermosetting resin compositions is effected by the provision of energy and preferably by the application of heat. The curing or crosslinking typically results from heating the thermosetting resin composition to an elevated temperature, e.g., to a temperature of at least about 150° C., but preferably upon heating to a temperature from about 175° C. to about 300° C. It is often desirable to effect the curing of the composition in stages. For example, a composition is suitably maintained in a first stage at a relatively low curing temperature of from about 175° C. to about 200° C. and then, in a second stage, is maintained at a higher temperature, e.g., from about 210° C. to about 250° C., to complete the cure. The cured products, often referred to as thermoset resins, are highly crosslinked solids having relatively high glass transition temperatures and good properties of rigidity, strength and solvent resistance. The thermosetting resin compositions are processed by methods which are conventional for the curing of thermosetting resins to produce cured products which are useful in adhesive compositions and in structural applications in the aerospace and electronic industries.

The invention is further illustrated by the following Illustrative Embodiments which should not be regarded as limiting.

ILLUSTRATIVE EMBODIMENT I

Benzoylformic acid, 25 g, and 11.25 g of acetone in 30 g of acetic acid and 45 g of concentrated sulfuric acid were heated at 105° C.–110° C. for 1 hour. After the resulting mixture was cooled to ambient temperature, it was poured onto ice and the mixture was allowed to warm to room temperature. The suspended particles were recovered by filtration and recrystallized from ethanol to give 3,8-diphenyl-2,7-dioxo-1,6-dioxaspiro[4.4]nona-3,8-diene, m.pt. 235°–237° C., as white powder. Infrared and nuclear magnetic resonance spectra of the powder were consistent with this structure.

ILLUSTRATIVE EMBODIMENT II

A mixture of 3.04 g of the product of Illustrative Embodiment I and 1.98 g of di(4-aminophenyl)methane was melted at 130° C.–150° C. and then heated in an oven, initially at 200° C. for 2 hours and then at 240° C. for 4 hours. The resulting cured, crosslinked product had a glass transition temperature of 137° C.

ILLUSTRATIVE EMBODIMENT III

A mixture of 3.0 g of the product of Illustrative Embodiment I, 0.30 g of di(4-maleimidophenyl)methane and 2.7 g of 2,2-di(4-cyantophenyl)propane was melted at 120° C.–130° C. The mixture was then heated in an oven at 200° C. for 2 hours and then at 240° C. for 4 hours. The resulting cured, crosslinked material had a glass transition temperature of 234° C.

What is claimed is:

1. A curable thermosetting resin composition comprising (1) a spirodilactone of up to 40 carbon atoms inclusive represented by the formula

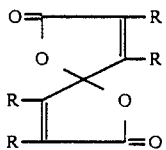

wherein R independently is hydrogen, halogen, aliphatic of up to 10 carbon atoms inclusive or aromatic of up to 10 carbon atoms inclusive and (2) at least one additional polymerizable monomer of up to 30 carbon atoms inclusive having at least two functional group substituents incorporating active hydrogen atoms or multiple bonds between adjacent atoms.

2. The composition of claim 1 wherein the at least one additional polymerizable monomer is represented by the formula $$LZ_z$$

wherein Z is a functional group substituent incorporating active hydrogen or multiple bonds between adjacent atoms, z is an integer of at least 2 and L is isocyanurate or $+R''-X-R'')_r$ wherein R'' is divalent aliphatic or aromatic of up to 10 carbon atoms inclusive, X is a direct valence bond or X is oxy, thio, carbonyl, sulfonyl or carbonato and r is zero or 1.

3. The composition of claim 2 wherein Z incorporates active hydrogen.

4. The composition of claim 3 wherein Z is amino, hydroxy, carboxyl or acid anhydride.

5. The composition of claim 2 wherein Z has multiple bonds between adjacent atoms.

6. The composition of claim 5 wherein Z is cyanato or maleimido.

7. The composition of claim 2 wherein the spirodilactone is represented by the formula

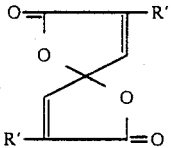

wherein R' is alkyl of up to 10 carbon atoms inclusive or aryl of up to 10 carbon atoms inclusive.

8. The composition of claim 7 wherein the spirodilactone is present in at least about 40% by weight based on total composition.

9. The composition of claim 8 wherein z is 2 or 3.

10. The composition of claim 9 wherein Z incorporates active hydrogen.

11. The composition of claim 10 wherein Z is amino, hydroxy, carboxyl or acid anhydride.

12. The composition of claim 11 wherein R' is hydrogen, methyl, phenyl or benzyl.

13. The composition of claim 12 wherein R' is phenyl and $LZ_z$ is di(4-aminophenyl)methane.

14. The composition of claim 9 wherein Z incorporates multiple bonds between adjacent atoms.

15. The composition of claim 14 wherein Z is cyanato or maleimido.

16. The composition of claim 15 wherein R' is hydrogen, methyl, phenyl or benzyl.

17. The composition of claim 16 wherein R' is phenyl and $LZ_z$ is di(4-maleimidophenyl)methane.

18. The composition of claim 16 wherein R' is phenyl and $LZ_z$ is 2,2-di(4-cyanatophenyl)propane.

19. The crosslinked insoluble product obtained by heating the composition of claim 1 to a temperature above about 150° C.

20. The crosslinked insoluble product obtained by heating the composition of claim 13 to a temperature from about 175° C. to about 300° C.

* * * * *